(12) United States Patent
Shimoda et al.

(10) Patent No.: US 6,635,380 B1
(45) Date of Patent: Oct. 21, 2003

(54) STORAGE BATTERY HAVING A PLURALITY OF CONTAINERS WITH ONE COVER

(75) Inventors: Kazuhiko Shimoda, Kosai (JP); Akira Iwamura, Sakai (JP); Yasuyuki Yoshihara, Toyohashi (JP); Ayako Hirao, Nagoya (JP); Nobuyuki Takami, Toyohashi (JP); Kiichi Koike, Naka-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 293 days.

(21) Appl. No.: 09/588,493

(22) Filed: Jun. 6, 2000

(30) Foreign Application Priority Data

| Jun. 7, 1999 | (JP) | ............................................. 11-159070 |
| Jun. 9, 1999 | (JP) | ............................................. 11-161909 |
| Jun. 9, 1999 | (JP) | ............................................. 11-161910 |

(51) Int. Cl.[7] ........................ H01M 10/48; H01M 2/04; H01M 2/02; H01M 10/50; H01M 2/20
(52) U.S. Cl. ........................ 429/93; 429/148; 429/160; 429/161
(58) Field of Search ................................ 429/148–161, 429/87–93, 120

(56) References Cited

U.S. PATENT DOCUMENTS

| 729,550 | A | * | 6/1903 | Condict ........................ 429/148 |
| 3,338,452 | A | * | 8/1967 | Oakley et al. .............. 220/23.4 |
| 4,347,294 | A | | 8/1982 | Mejia |
| 4,521,498 | A | * | 6/1985 | Juergens ....................... 429/160 |
| 4,592,972 | A | * | 6/1986 | Juergens et al. ............. 429/160 |
| 6,312,851 | B1 | * | 11/2001 | Fukuda et al. ............... 429/120 |

FOREIGN PATENT DOCUMENTS

| EP | 0 771 037 A1 | 5/1997 |
| JP | 08227700 A | 9/1996 |

* cited by examiner

Primary Examiner—Carol Chaney
Assistant Examiner—Susy Tsang-Foster
(74) Attorney, Agent, or Firm—Akin, Gump, Strauss, Hauer & Feld, LLP.

(57) ABSTRACT

The present invention provides a high output storage battery with a high reliability that is easy to fabricate. This storage battery comprises a plurality of monoblock containers united to each other with space provided between the adjacent monoblock containers and one common cover to seal the openings of those monoblock containers. Each monoblock container has a plurality of cell compartments separated from each other by partitions. Each of those cell compartments houses an assembly element comprising a plurality of positive electrode plates and negative electrode plates stacked with separators placed between them.

12 Claims, 14 Drawing Sheets

FIG. 6
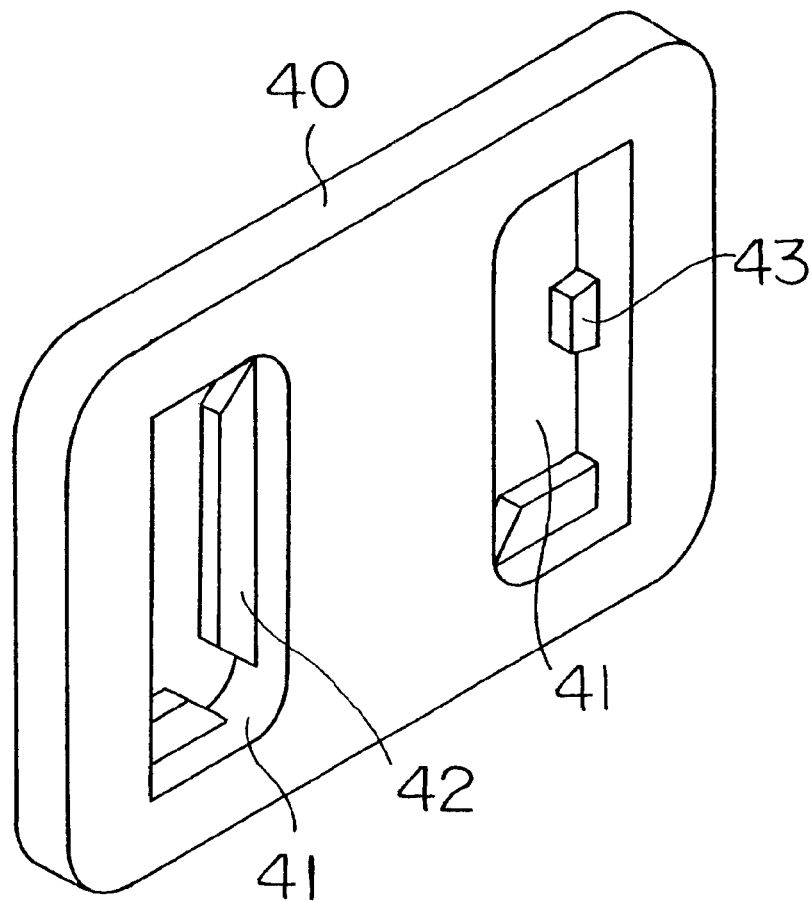
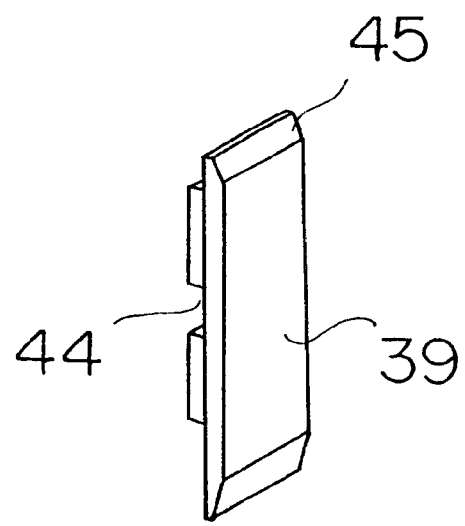

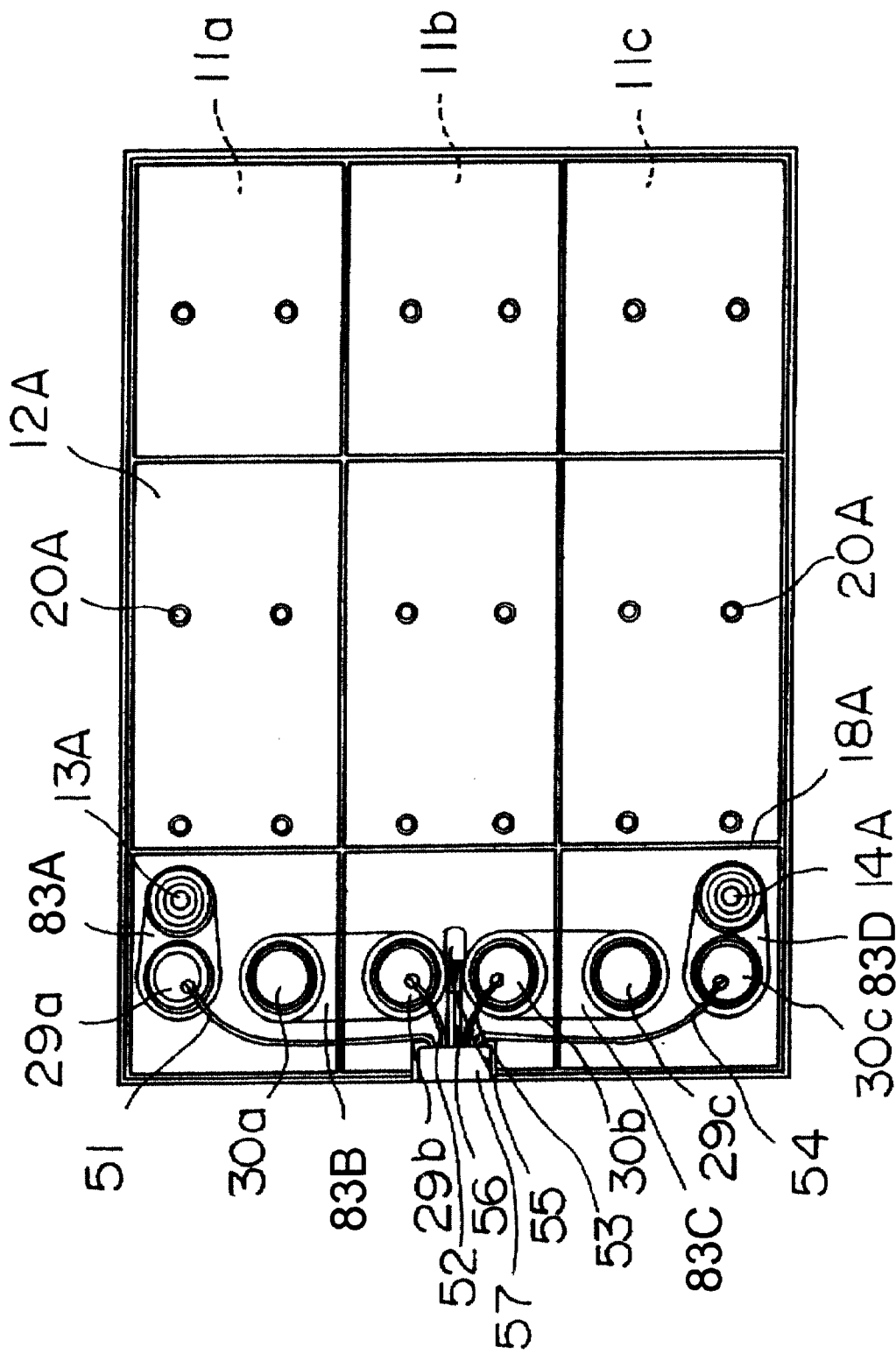

STORAGE BATTERY HAVING A PLURALITY OF CONTAINERS WITH ONE COVER

BACKGROUND OF THE INVENTION

The present invention relates to a high output storage battery, more particularly to a lead-acid storage battery formed by uniting storage batteries having a plurality of cells.

There has been a growing demand for high output storage batteries as for backup power source in uninterruptive power supply units. A high output can be achieved by raising the voltage of storage battery. Research has been conducted to develop a storage battery that produces higher voltage than the conventional 6-volt or 12-volt storage battery. To raise the voltage, the cells connected in series have to be increased in number. One idea to achieve that is to connect a plurality of storage batteries by means of external wiring and to pack the storage batteries as by putting them in a metal or plastic case or strapping them by adhesive tape.

Such packing work involves troublesome external wiring and incurs expenses for packing materials and labor, resulting in an expensive storage battery. Another problem is that the storage battery thus obtained itself generates heat and goes up in temperature during discharging. Generally speaking, as the service temperature of the storage battery goes up, the cycle life will shorten. That is especially the case with the sealed lead-acid storage battery that fast falls in cycle life at high temperature. That is because of deterioration of the positive electrode plate exemplified by corrosion of the positive electrode grid and decrease of water in the electrolyte which are observed when the battery generates heat.

Attempts have been made to prevent the storage battery from deteriorating in performance because of heat generation. According to a method disclosed in Japanese Laid-Open Patent Publication No. Hei 8-27700, a necessary number of cell containers, one container housing one cell, are put together with some space left between them and are sealed with a common cover. In that arrangement, cooling space is secured around all the cells that make up a storage battery, especially a lead-acid storage battery. Through the space, the heat generated in the storage battery can be effectively dissipated. However, a fairly large number of cell containers are required to fabricate a storage battery with such a high output as needed in the market of late.

Another problem with that arrangement is that the connections between the cells are made over the cell container sidewalls. The intercell connectors that electrically connect the cells are sealed by adhesive in recesses provided on the inside surface of the container cover. The adhesive is also used to bond the cell containers and the container cover. In this arrangement, it is necessary to fill the adhesive into the recesses provided on the inside surface of the container cover for intercell connection and grooves for the battery container to fit into. If the number of cell containers is three or so, the filling work is not so troublesome. But to fabricate a 24-volt or higher output storage battery aimed at by the present invention, the number of cells required is not less than 12 in a lead-acid storage battery. In such a storage battery, the recesses and the fitting grooves are complicated, and it is very difficult to fill the adhesive in the recesses and grooves uniformly. As long as the cell containers are arranged in a row, it does not present serious problems. The problem is when cell containers are arranged in a plurality of rows. Especially, in case a battery is formed of three or more rows of cell containers, some cell containers are surrounded on all the four sides by the adjacent cell containers. In such a case, it is quite difficult to fit the container cover into the cell containers. That has been a problem in the manufacturing process.

Furthermore, in case a sealed storage battery according to this method is laid sideways, that is, in the fallen position, stress will concentrate in the bonded portion between the cell containers and the container cover and the joint portions provided on the cell containers. Since the cell container is formed of a single cell, the stress concentrated in the joint portions reaches the assembly element through the container sidewall. That is, the assembly element is forced to support the joint portions of the cell container in the cell compartment. That will have not only adverse effects on the characteristics of the storage battery but also decreases the strength of the plastic cell container, resulting in much deformation in the portion of the cell container side wall where the joint is provided and could cause micro cracks in the container. Such deformation of the cell container can cause extreme concentration of stress in the bonded portion between the cell container and the container cover, resulting in the separation of the bonded portion and affecting the liquid tightness and air tightness between the container and the container cover, thus greatly deteriorating the performance of the storage battery.

BRIEF SUMMARY OF THE INVENTION

In view of the prior art described above, including the disadvantages and deficiencies of the prior art, an object of the present invention is to provide a high output storage battery with a high reliability that is easy to fabricate.

Another object of the present invention is to provide a storage battery that can be used in different positions such as an upright position and a fallen position.

A still another object of the present invention is to provide a storage battery especially of the 24-volt or 36-volt type.

The present invention provides a storage battery which comprises a plurality of monoblock containers put together with some space provided between them and a common container cover to close the openings of the monoblock containers, each monoblock container having a plurality of cell compartments separated from each other by partitions and each cell compartment housing an assembly element including positive and negative electrode plates stacked with separators placed between them.

The assembly element in each cell compartment of the monoblock container is electrically connected in series with the assembly element in the next cell compartment through the aperture provided in the partition between the cell compartments. At the ends of a block of assembly elements connected to each other are a pair of output terminals—the positive electrode pole and the negative electrode pole.

In a preferred mode of the present invention, each monoblock container has two parallel cell rows of cell compartments, the cell compartments separated from each other by partition. Each cell row is formed of cell compartments arranged in one direction. The two cell rows of cell compartments are provided side by side in parallel. The respective monoblock containers are so positioned that the cell rows are in parallel with each other.

More particularly, the assembly elements of the respective cell rows in the monoblock container are electrically connected in series through apertures—an aperture provided in the partition between the assembly elements in the adjacent cell compartments. In each container, the assembly element in the last cell compartment of the first cell row is connected in series to the assembly element in the cell compartment in the adjacent and corresponding position on the second cell row, also through an aperture provided in the partition between the two cell rows. The assembly element in the first cell compartment at the first end of one cell row has one positive electrode pole and the assembly element in the corresponding cell compartment on the other cell row has one negative electrode pole. The pair of the electrode poles permits the taking out of the output of the cells in the monoblock container. The container cover has a positive terminal connected to the positive electrode pole of the monoblock container at one end, a negative electrode terminal connected to the negative electrode pole of the monoblock container at the other end, and connectors that connect the positive electrode poles and the negative electrode poles of the neighboring monoblock containers.

In another preferred mode of the present invention, each monoblock container has one cell row including a plurality of cell compartments disposed in one direction and separated from each other by partitions. The respective monoblock containers are so arranged that the cell rows are in parallel with each other.

More specifically, the assembly element of each cell compartment of the monoblock container is electrically connected to the assembly element of the neighboring cell compartment through an aperture provided in the partition between them. The assembly element in the cell compartment at one end has a positive electrode pole while the assembly element in the cell compartment at the other end has a negative electrode pole. The container cover has a positive terminal connected to the positive electrode pole of the monoblock container at one end, a negative electrode terminal connected to the negative electrode pole of the monoblock container at the other end, and connectors that connect the positive electrode poles and the negative electrode poles of the neighboring monoblock containers.

The two ends of the connector are each connected to metal bushings insert molded to the container cover. One bushing is connected to the positive electrode pole of the monoblock container, while the other bushing is connected to the negative electrode pole of the neighboring monoblock container.

In a container having two cell rows, it is desirable that the stacking direction of the electrode plates of the assembly element is the same as the disposing direction of the cell rows. In the container having one cell row, it is preferable that the stacking direction of electrode plates of the assembly element is identical with the disposing direction of the cell compartments.

In a further preferred mode of the present invention, the monoblock container has a plurality of parallel ribs on the outside surface which form spaces between that monoblock container and the adjacent monoblock container. The spaces are for coolant to pass through.

In a still further preferred mode of the present invention, the monoblock container has a plurality of parallel ribs on the outside surface along the lines corresponding to the side ends of the aforesaid partitions, the parallel ribs forming spaces between that monoblock container and the adjacent monoblock container. The spaces are for coolant to pass through.

In still another preferred mode of the present invention, the monoblock container has projections at the lower right and left corners of the side face corresponding to the ends of the cell rows. One projection is linked with the projection of the adjacent monoblock container via a coupler having holes that fit over the projection. Thus, the adjacent monoblock containers are united.

In a further preferred mode of the present invention, the monoblock container has the ribs pressed against the corresponding ribs of the adjacent monoblock container. Thus the adjacent monoblock containers are united with each other via the ribs.

In still another preferred mode of the present invention, the monoblock container has a sealed chamber provided with openings communicating with the respective cell compartments, safety valves closing the respective openings in the sealed chamber, and an air passage having an explosion-proof mechanism through which the sealed chamber communicates with the outside.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 6 is a perspective view showing the coupler to unite the containers and the projection which engages with the coupler.

FIG. 8 is a top view of a lead-acid storage battery with the top plate removed of another embodiment in accordance with the present invention.

DETAILED DESCRIPTION OF THE INVENTION

Figure 1:
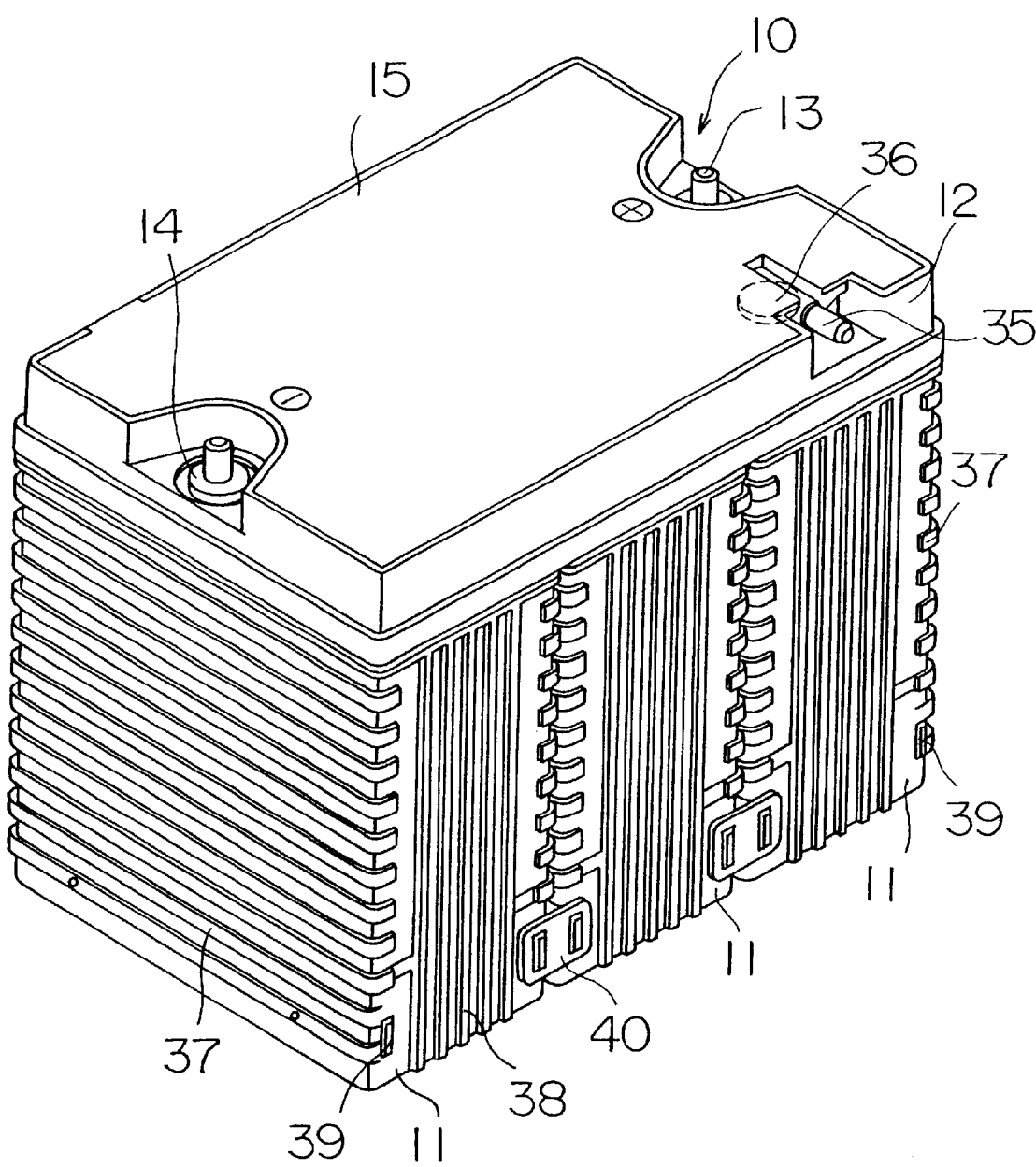
FIG. 1 is a perspective view of a lead-acid storage battery of an embodiment in accordance with the present invention.
Figure 2:
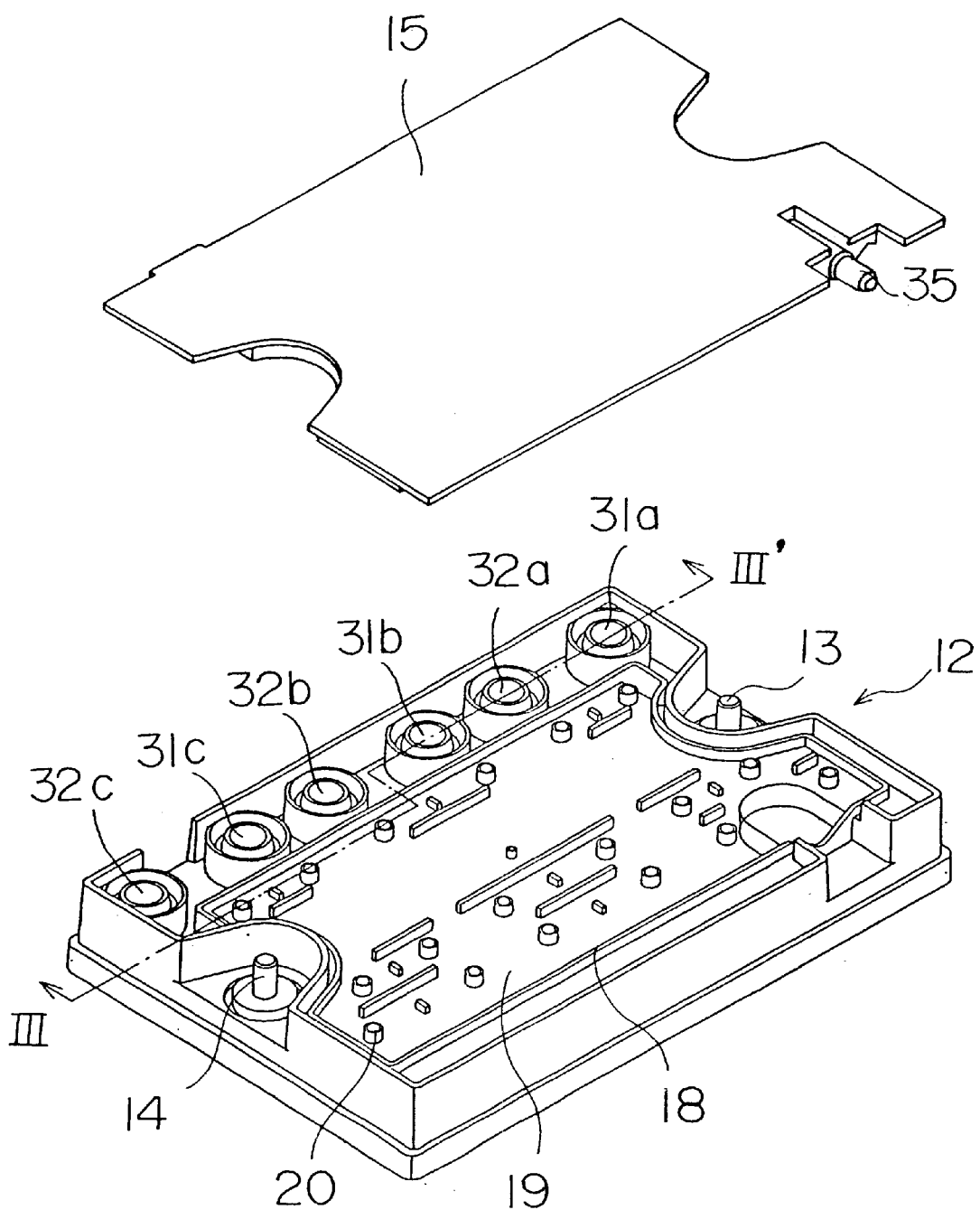
FIG. 2 is a perspective view of the container cover and the top plate of the storage battery.

Now, a lead-acid storage battery embodying the present invention will be described with reference to the accompanying drawings.

Embodiment 1

FIG. 1 to FIG. 6 show a lead-acid battery in a first embodiment.

A sealed lead-acid storage battery indicated by the numeral 10 has three monoblock containers 11 disposed side by side and sealed with a common container cover 12, each monoblock container 11 including 6 cells connected to each other in series. The container cover 12 has a pair of terminals—a positive electrode terminal 13 and a negative electrode terminal 14. The container cover 12 is overlaid with a top plate 15. The monoblock containers, container cover and top plate are all made of polypropylene.

Figure 4:
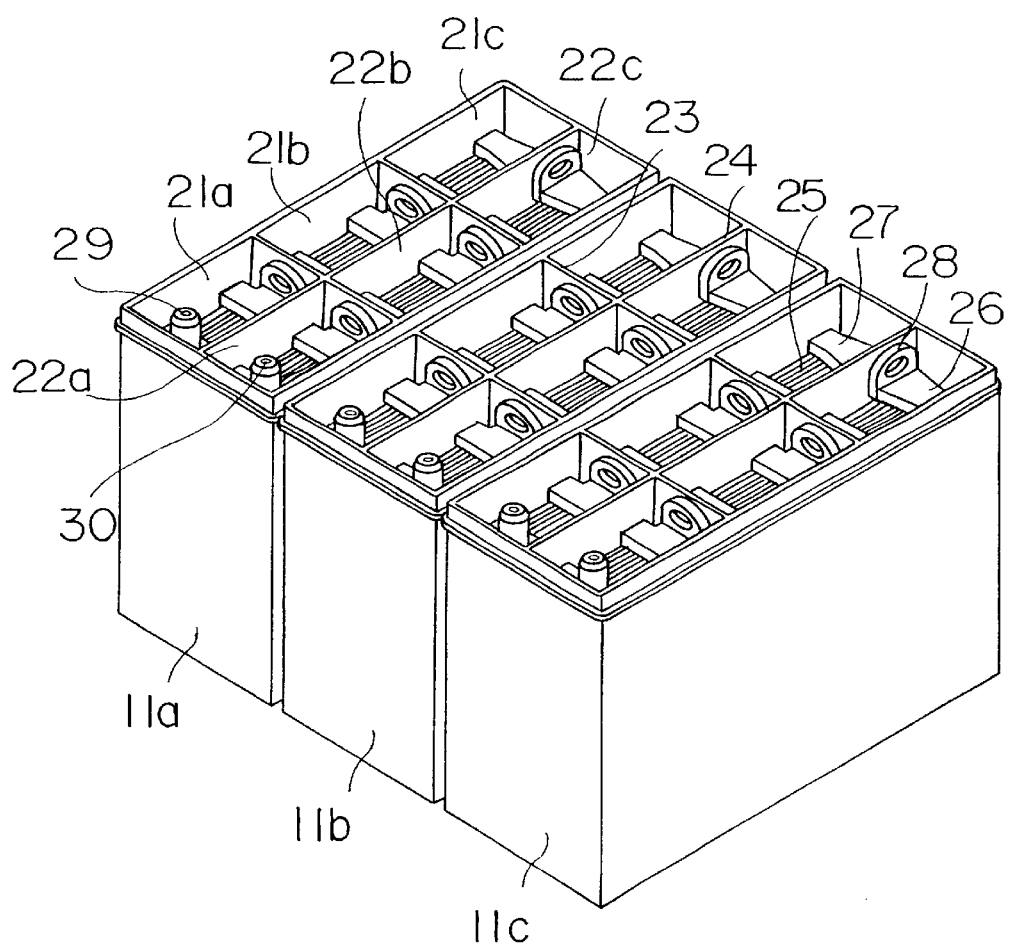
FIG. 4 is a perspective view of monoblock containers before joined to the container cover.
Figure 5:
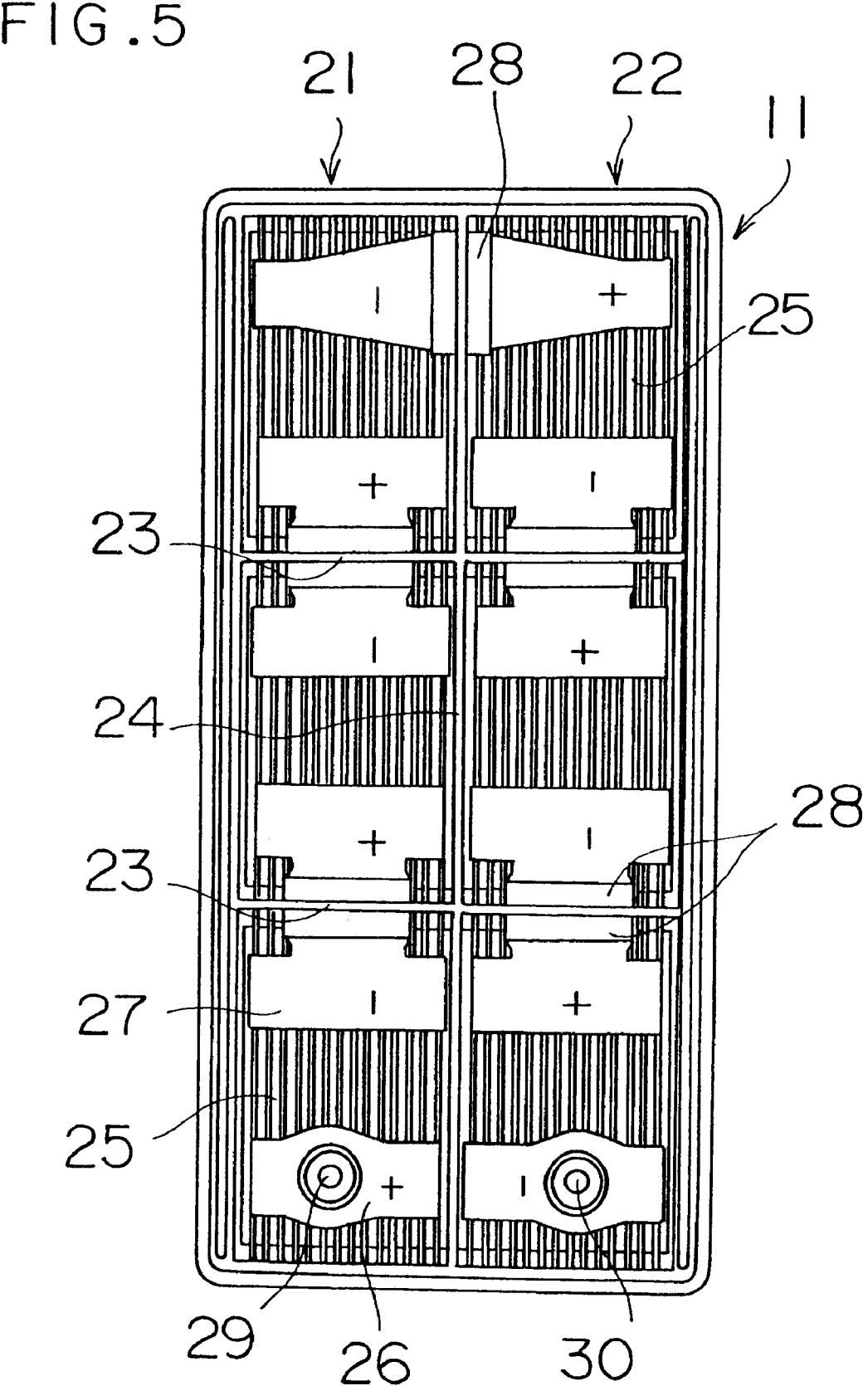
FIG. 5 is a top view of the container.

The monoblock container 11 has two cell rows 21, and 22 disposed in parallel with each other as shown in FIGS. 4 and 5. The cell row 21 has three cell compartments 21a, 21b and 21c that are placed one after another in a straight line. The cell row 22 has three cell compartments 22a, 22b and 22c that are provided also linearly one after another. The cell compartments in one cell row are separated by partitions 23, and the cell compartments in one cell row are separated from the cell compartments in another cell row by partition 24. Those 6 cell compartments each house an assembly element 25. The assembly element 25 is comprised of a number of positive and negative electrode plates piled or stacked one after another with separators between the plates. In the cell compartment, those electrode plates are placed in such a way that the stacking pressure is applied in the stacking direction. Each assembly element 25 has a strap 26 connected to the lugs of the positive electrode plates and a strap 27 connected to the lugs of the negative electrode plates. At the ends of those straps, there are provided connector pieces 28 which are extended upward to be connected to the adjacent assembly element. The adjacent assembly elements in a cell row are connected in the following way. The strap on the positive electrode side of one assembly element is connected to the strap on the negative electrode side of the other assembly element through an aperture provided in the partition 23. The assembly elements at the adjacent ends of the two cell rows are connected to each other with the straps on the positive and negative electrode sides joined with each other through an aperture provided in the partition 24. Thus, the assembly elements in the 6 cell compartments are connected in series, forming a block of assembly elements. The assembly element at one end of the cell row has a positive electrode pole 29 and the assembly element at the same side end of another cell row has a negative electrode pole 30. The output of the block of the assembly elements in the monoblock container 11 can be taken out from the positive electrode pole 29 and the negative electrode pole 30.

Three monoblock containers 11 are put together with the cell rows parallel with each other and with the positive and negative electrode poles provided on the same side and are sealed with one container cover 12. The container cover 12 has connecting means to connect in series the assembly element blocks of each monoblock container. That is, the container cover 12 has 6 lead alloy bushings to connect the electrode poles. And the positive electrode pole 29 and the negative electrode pole 30, both made of lead alloy, in the container 11a shown in FIG. 4 are fit into bushings 31a and 32a on the container cover and joined to the bushings by heating with a burner. Similarly, the positive electrode pole and the negative electrode pole in the container 11b are joined to bushings 31b and 32b. And the positive electrode pole and negative electrode pole in the container 11c are joined to the bushings 31c and 32c.

Figure 3:
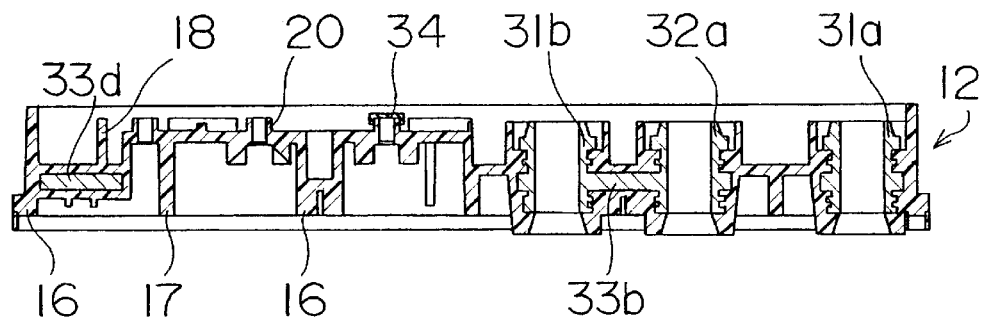
FIG. 3 is a sectional view taken on line III–III' of FIG. 2.

The container cover 12 has a connector 33b that connects the bushings 32a and 31b and a connector 33d that connects the bushing 32c and the negative electrode terminal 14 as shown in FIG. 3. While not shown, there are provided a connector for connecting the positive electrode terminal 13 and the bushing 31a and a connector for connecting the bushings 32b and 31c. Those connectors connect in series the assembly element blocks in the containers 11.

The container cover 12 has ribs 16 to be mated with the opening end of each monoblock container 11 and partitions 17 to be joined with the partitions 23 and 24 of the monoblock container 11. The containers and the container cover are united by way of those parts by thermal welding, so that each cell compartment is isolated air-tight and liquid-tight. On the container cover 12, there is provided a continuous rib 18. This rib is welded to the corresponding rib (not shown) provided on the top plate 15 by ultrasonic welding. Thus formed is a sealed chamber 19 partitioned by the ribs. This sealed chamber 19 is provided with pipes that have holes communicating with the respective cell compartments. The pipes 20 are sealed with rubber valves 34. A slight space or gap is provided between the top of the rubber valve and the top plate 15. The top plate keeps the rubber valves from coming off the pipes. The sealed chamber 19 communicates with the outside through an exhaust duct 35 having a flame arrester filter 36 set on the top plate. If the gas pressure rises abnormally in the cell compartment as when gas generates during charging, for example, the gas pushes and expands the rubber valve 34 and enters the sealed chamber 19 and goes out from exhaust duct 35 through the flame arrester filter 36. The flame arrester filter 36 prevents the gases generated in the battery from catching fire.

Figure 7A:
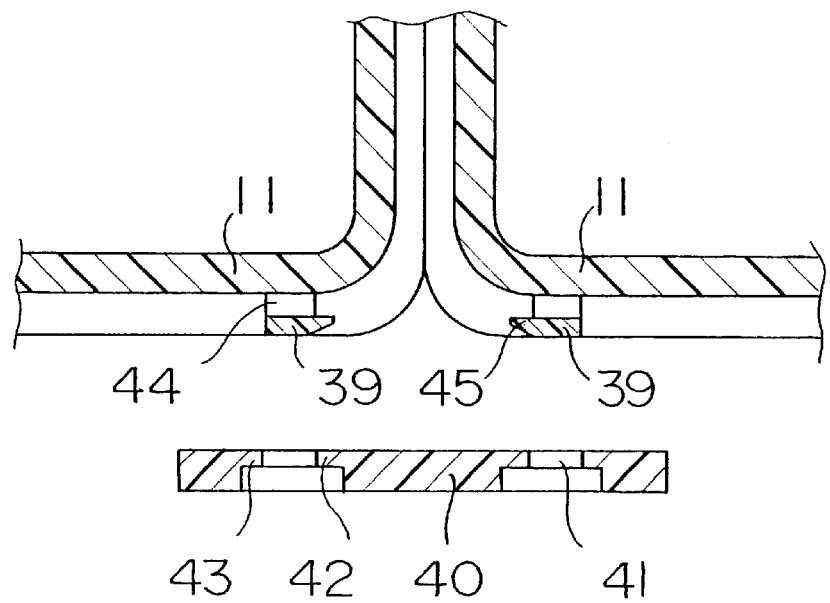
FIG. 7A is a transverse sectional view showing the coupler to unite the containers and a vital part of the containers.
Figure 7B:
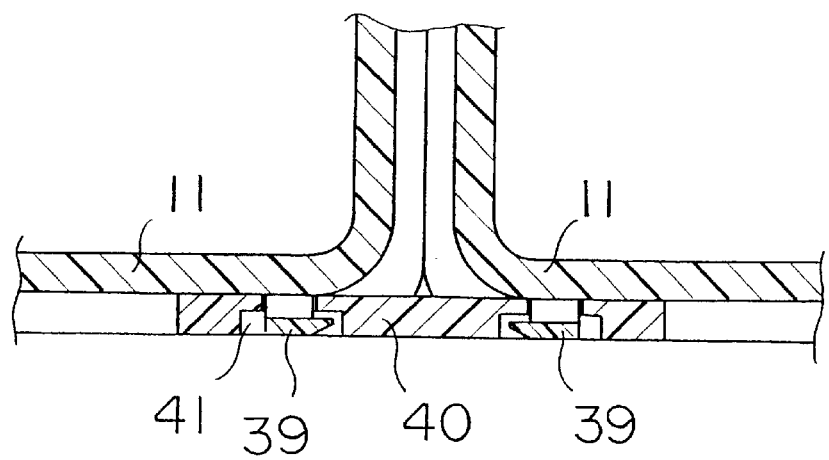
FIG. 7B is a transverse sectional view showing the vital part of the containers united with the coupler.
Figure 9:
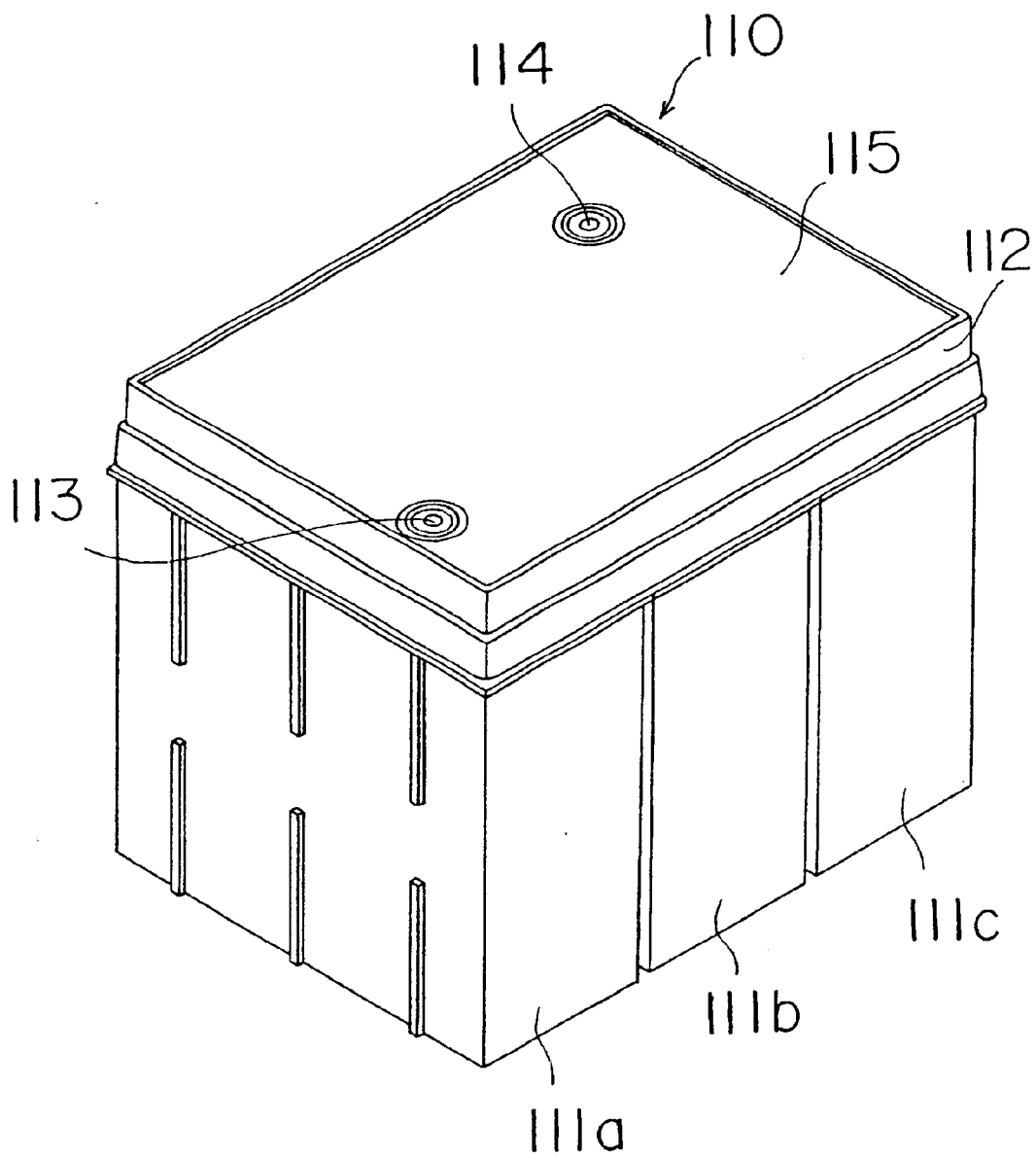
FIG. 9 is a perspective view of a lead-acid storage battery of still another embodiment in accordance with the present invention.

The monoblock container 11 has a plurality of ribs 37 on the side walls parallel with the cell row that extend horizontally. And when the monoblock containers 11 put together in parallel with each other, the ribs 37 are pressed against with each other, forming air passages between upper and down ribs that cool the containers. On the other two sides, the monoblock container 11 is provided with a plurality of reinforcing ribs 38 that extend vertically. In FIG. 4, the ribs 37 and 38 provided on the sides of the monoblock container 11 are omitted. On the lower right and left of the sides having ribs 38, there are provided engaging projections 39 and 39. Each two adjacent projections 39 and 39 are linked via a coupler 40 that has holes to engage with the projections 39 and 39. As shown in FIG. 6, the projection 39 has a brim 45 at the top so that the top portion is slightly wide and is provided with a recession or an aperture in the middle. Meanwhile, the holes 41 and 41 of the coupler 40 are provided with projected pieces 42 and 43. If, therefore, the projections 39 and 39 of the adjacent containers are pressed into the holes 41 and 41 of the coupler 40, the projected pieces 42 and 43 engage with the brim 45 and the aperture 44 of the projection 39 as shown in FIG. 7, uniting the two adjacent monoblock containers. This way, three monoblock containers are united with four couplers 40 put in place at the lower corners.

The lead-acid storage battery is fabricated in the following way. First, the assembly elements are placed in the respective cell compartments of the monoblock container 11 and the assembly elements are connected to each other in series. That makes a U-shaped block of assembly elements. The first assembly element at the first end of the U-shaped block of assembly elements is connected to the positive electrode pole and the last assembly element at the other end of the block is connected to the negative electrode pole. Three monoblock containers 11 are put together in parallel and each two adjacent containers are united with couplers 40. The openings of the three monoblock containers 11 are sealed with one container cover 12. The sealing is effected by thermal welding. Then the positive electrode pole and negative electrode pole are welded to the respective bushings of the container cover. The welding is done by heating the electrode poles and bushings with burner flame. After that, electrolyte is injected into the cell compartments through the pipes 20. After the assembly elements are well impregnated with electrolyte, the rubber valves 34 are put on the pipes 20. Then, the top plate 15 is placed over the container cover 12, and the two are joined by ultrasonic welding. Thereafter, the assembly elements are energized for formation.

Embodiment 2

FIG. 8 is a top view of a lead-acid storage battery with the top plate removed in this embodiment. The numeral 12A indicates the container cover. This cover seals the openings of the three monoblock containers 11a, 11b and 11c that have been described in Embodiment 1. The cover 12A has the positive electrode pole 29 and the negative electrode pole 30 in each monoblock container passed through it. The positive electrode pole 29a of the monoblock container 11a is connected to the positive electrode terminal 13A via connector 83A, and the negative electrode pole 30a is connected to the positive electrode pole 29b of the adjacent monoblock container 11b via connector 83B. The negative electrode pole 30b of the monoblock container 11b is connected to the positive electrode pole 29c of the monoblock container 11c via connector 83C. The negative electrode pole 30c of the monoblock container 11c is connected to the negative electrode terminal 14A via connector 83D. Thus, the assembly elements blocks of each monoblock container are connected in series so that the output can be taken from the positive electrode terminal 13A and negative electrode terminal 14A.

As in Embodiment 1, the container cover 20A is provided with pipes 20A having openings that communicate with the respective cell compartments. Those pipes are mounted with rubber valves.

To the positive electrode poles 29a and 29b and negative electrode poles 30b and 30c are soldered and connected lead wires 51, 52, 53 and 54 for detection of voltage, respectively. Those lead wires and lead wire 56 of a thermistor 55 mounted near the positive electrode pole 29b are each connected to connectors 57 that are provided with the respective terminals.

That configuration permits measurement through lead wires 51 and 52 of the voltage of the block of assembly elements connected in series in the monoblock container 11a. This way, the voltage of the block of assembly elements connected in series in each container can be measured independently by means of lead wires 51 to 54. Also, the temperature of the assembly element in the middle container can be measured by thermistor 55. For efficient measurement of the heat generated by the assembly element, it is desirable to mount the thermistor 55 near, preferably in contact with the electrode pole. As shown, the storage battery of the present embodiment is so configured that the voltage of the battery and the temperature signals can be taken up from the connector 57 in a lump. It is desirable that the connectors 83A–83D, lead wires 51 to 54 and thermistor 55 are mounted in a part separated by partition 18A from the area where the pipes 20A that constitute safety valves are located and that the connectors 83A–83D, the lead wires 51 to 54 and the thermistor 55 are fixed with an adhesive. While not shown, a top plate is overlaid over the container cover 12A.

A storage battery to produce a high voltage that is fabricated by uniting a number of monoblock containers generates much heat. Dissipation of that heat is different from container to container. Assembly elements in the containers that fail to dissipate heat well tend to overcharge or overdischarge in a cycle of charge and discharge, impairing the battery characteristics. To prevent such a problem, it is necessary to monitor the condition of assembly elements in the respective containers.

According to the present embodiment, the lead wires for detection of voltage that are connected to the positive electrode pole or negative electrode pole of each monoblock container are concentrated in one connector 57. That precludes no possibility of misconnection when the lead wires are connected to a voltage monitor. Furthermore, the thermistor is mounted on the middle monoblock container that can not dissipate heat well. That permits proper monitoring of the battery temperature.

Embodiment 3

FIGS. 9 to 13 show a lead-acid storage battery in a third embodiment. The lead-acid storage battery indicated by the numeral 110 is composed of three monoblock containers 111a, 111b and 111c arranged so that the cell rows are parallel with each other as in the preceding examples. In the present embodiment, however, each monoblock container 111 has a cell row of 6 cell compartments 121a, 121b, 121c, 121d, 121e and 121f separated from each other by partitions 123 and arrayed in one direction. The assembly element 125 housed in each cell compartment has a strap 126 connected to the lugs of the positive electrode plates and a strap 127 connected to the lugs of the negative electrode plates. The adjacent assembly elements are connected to each other with the strap 126 and the strap 127 connected by a connector piece 128 through an aperture provided in the partition. This way, the assembly elements in the respective cell compartments are connected in series to form a block of assembly elements. The assembly element in the first cell compartment of the block of assembly elements has a positive electrode pole 129 and the assembly element in the last cell compartment has a negative electrode pole 130.

Figure 10:
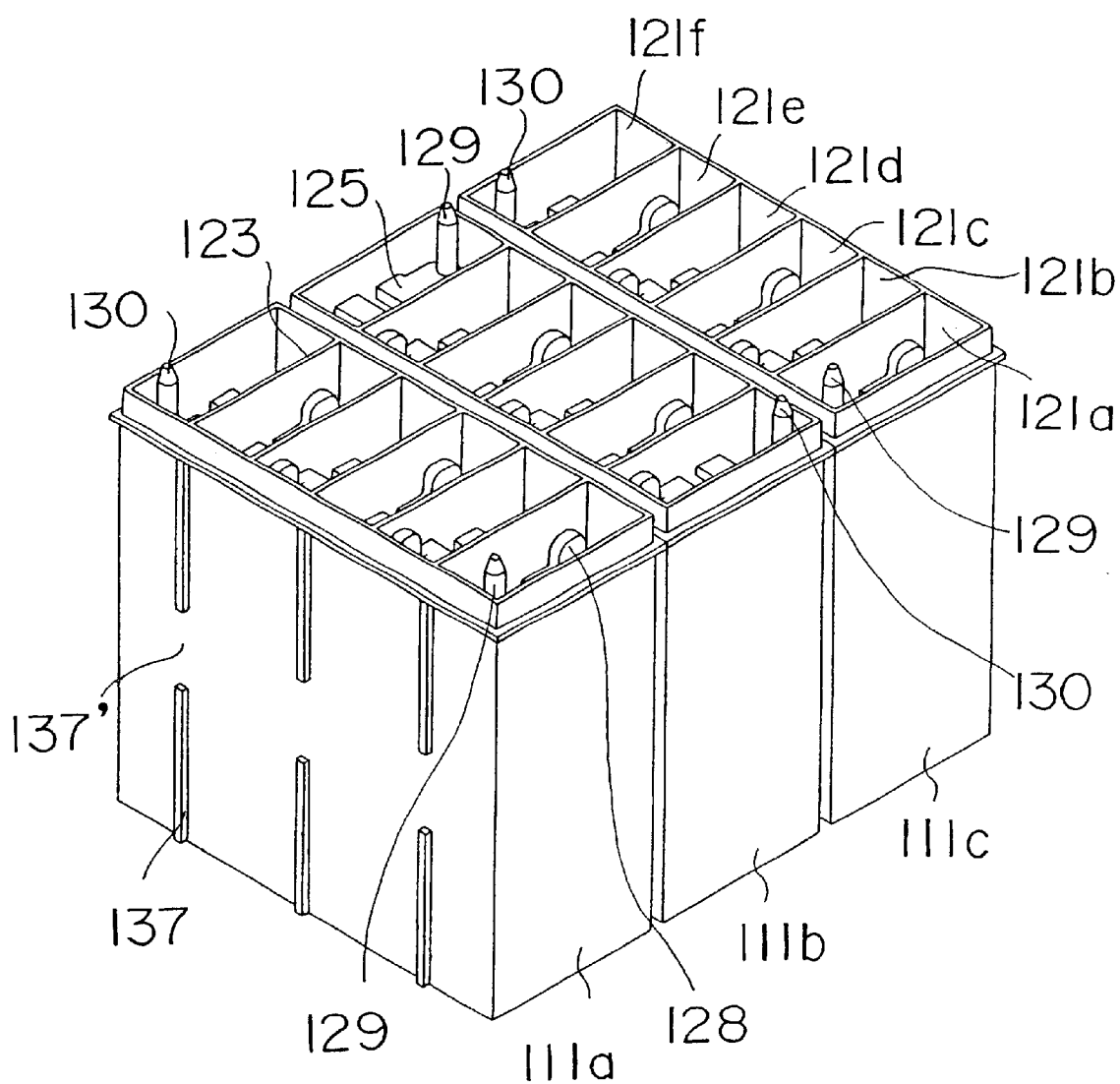
FIG. 10 is a top view of the lead-acid storage battery with the top plate and the container cover removed.

Each monoblock container 111 has vertical ribs 137 on its side walls. Those ribs are provided on the line corresponding to the side ends of every other partition. The ribs 137 have a notch 137' in the middle. If the monoblock containers of such a construction are put together, ribbed side to ribbed side, the ribs are pressed against the corresponding ribs of the other container. The ribs 137 are provided with notches 137' which form spaces for coolant to pass through. Through these spaces, the heat generated in the storage battery can be dissipated. In this example, the three neighboring monoblock containers are united to each other by thermally welding the ribs 137 as shown in FIG. 10.

Figure 11:
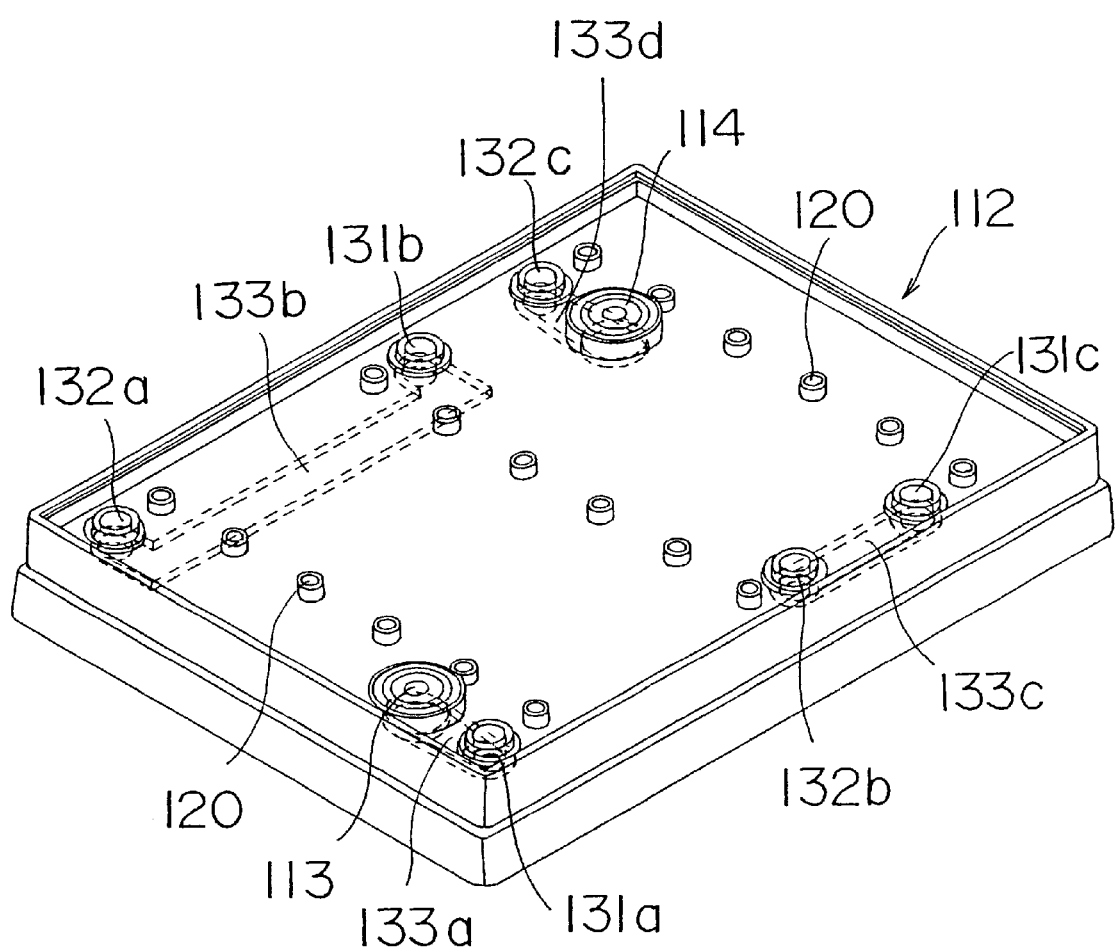
FIG. 11 is a perspective view of the container cover.
Figure 12:
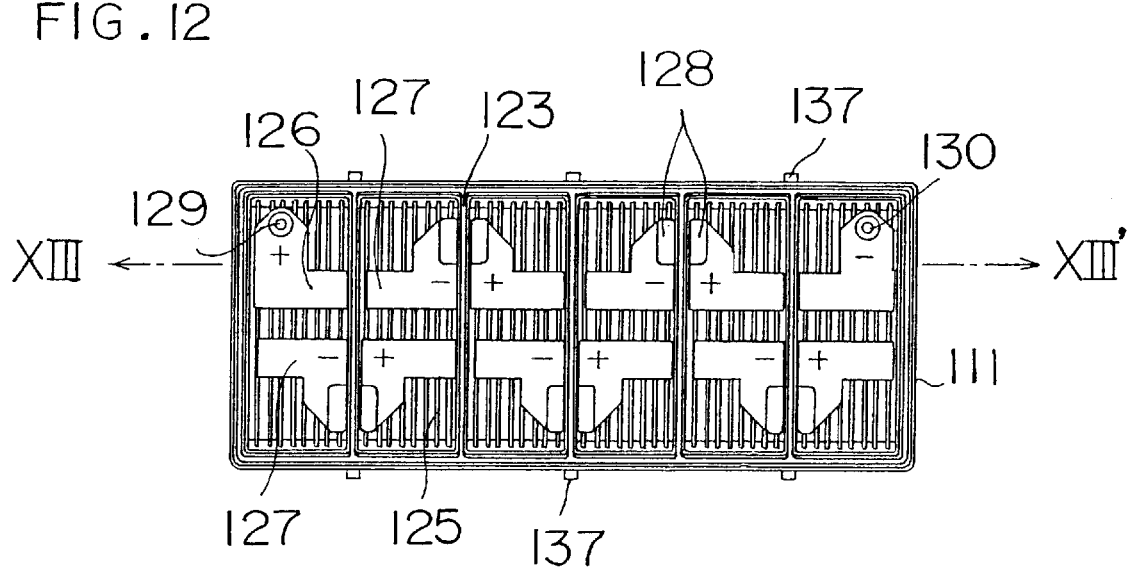
FIG. 12 is a top view of a monoblock container housing assembly elements.
Figure 13:
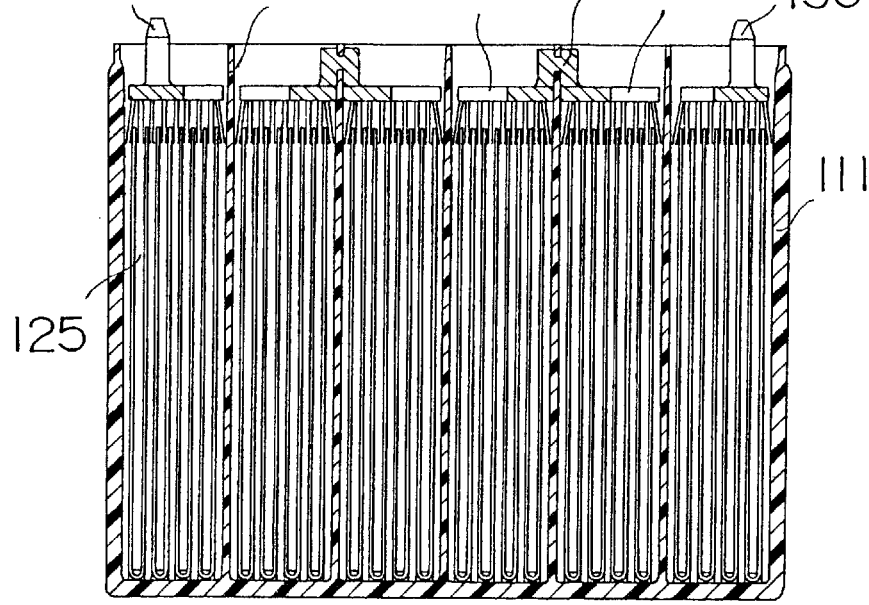
FIG. 13 is a cross-sectional view taken on line XIII–XIII' of FIG. 12.

The three containers thus united are thermally welded to the container cover 112 on the top, thus isolating the respective cell compartments from each other. As shown in FIG. 11, the container cover 112 has a bushing 131a to connect to the positive electrode pole 129 of the container 111a, a positive electrode terminal 113 connected to the bushing by a connector 133a, a bushing 132a to connect to the negative electrode pole 130 of the container 111a, a bushing 131b to connect to the positive electrode pole of the container 111b and a connector 133b to link bushings 132a and 131b. Furthermore, the container cover 112 has bushings 132b and 131c, and a connector 133c to link the two bushings, and bushing 132c, negative electrode terminal 114 and a connector 133d to link the bushing 132c and the negative electrode terminal 114. Through those arrangements, the blocks of assembly elements connected to each other in series in containers 111a, 111b and 111c are connected to each other in series, and the output can be out taken from the positive electrode terminal 113 and negative electrode terminal 114.

The container cover 112 has pipes 120 having openings that communicate with the cell compartments as in Embodiment 1. Sealed with rubber valves, those pipes serve as safety devices. The container cover 112 has a top plate 115 bonded on the top. On the top plate are exposed a positive electrode terminal and a negative electrode terminal.

In the example described above, the lead alloy bushings and connectors are joined to the container cover by insert molding. In another method, the bushings may be insert molded to the container cover. The connector that connects the bushings may be placed in a recess provided on the container cover, and the recess may be sealed with an adhesive.

Figure 14:
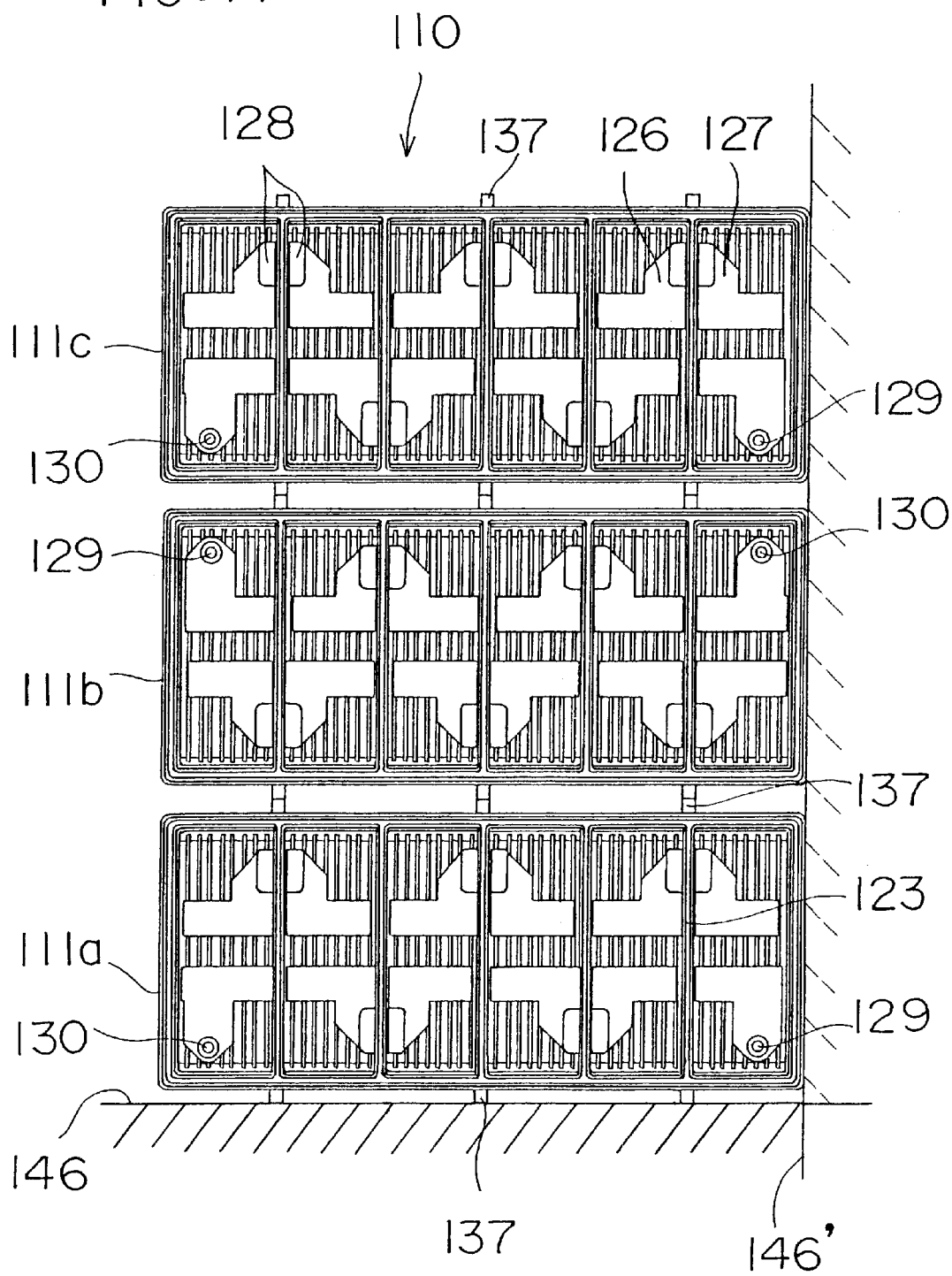
FIG. 14 is a side view of a lead-acid storage battery shown in an installation state.

FIG. 14 shows the lead-acid storage battery 110 thus fabricated. The battery 110 is installed in a state that the monoblock containers are placed one upon another. The arrangements inside the monoblock containers are also shown. The bottom container 111a is placed with its lower side ribs 137 on the installation ground 146 and with its upper side ribs 137 bearing the load of the upper containers. The ribs 137 are provided along the line on the outside surfaces that correspond to the side ends of the partitions 123, and can withstand the load. That is, the ribs 137 prevent cracks on the container sides or a deformation of the assembly elements inside the container. In order to enable the container to withstand a greater load, it is an idea to provide a rib along the line corresponding to the side end of each partition.

In case the lead-acid storage battery 110 is placed with its right side—the container side 146' indicated by dotted line in FIG. 14—on the installation ground, the load of the battery is borne on the horizontal underside and there is no fear of container walls getting cracked, either. In the assembly elements, the stacking direction of electrode plates is vertical, and the load increases the stacking pressure, resulting in a longer cycle life.

Figure 16:
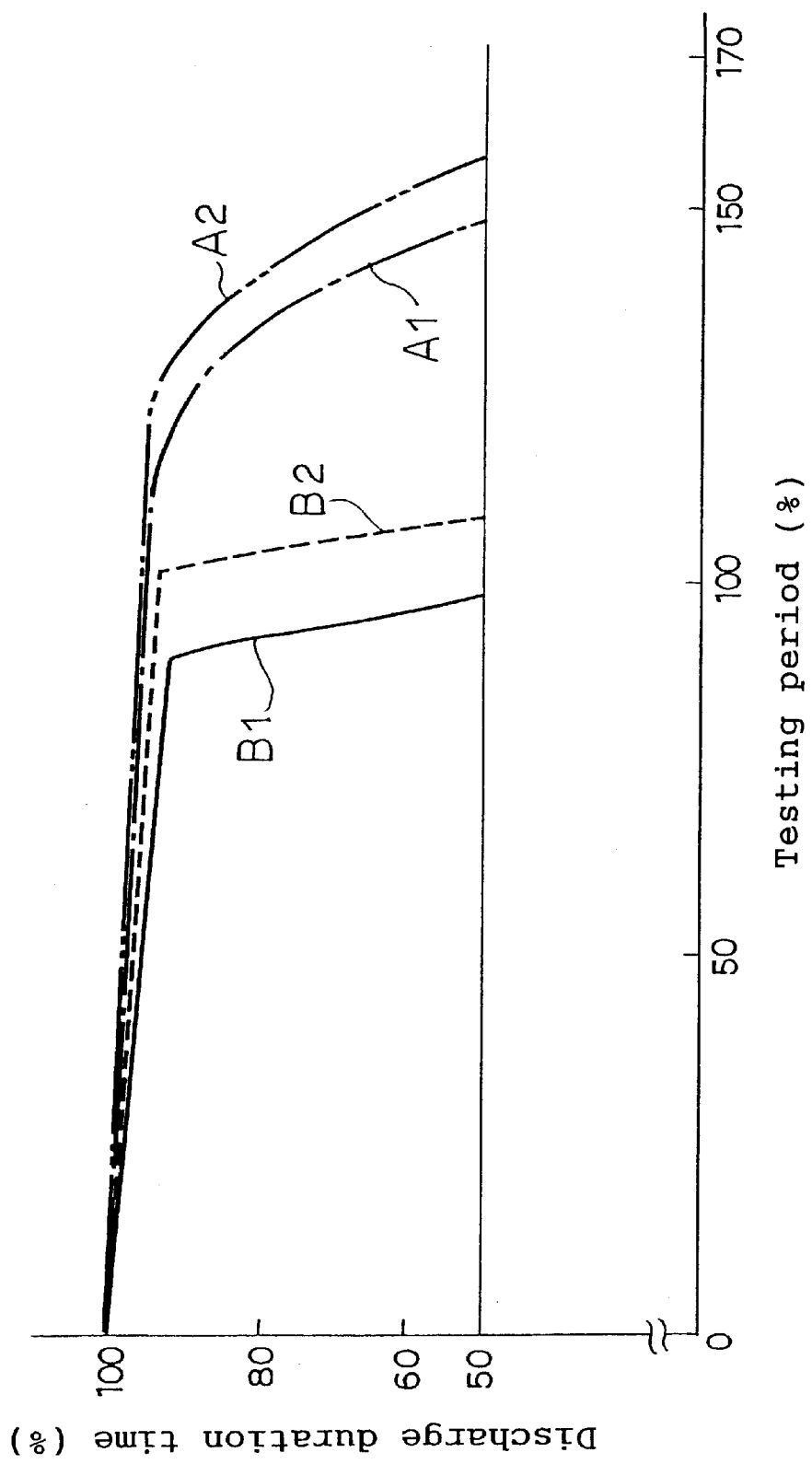
FIG. 16 is a diagram showing the results of cycle life tests of the lead-acid battery according to the present invention and a comparative example lead-acid storage battery.

Trickle cycle life tests were conducted at 60° C. with 36-volt, 17 Ah sealed lead-acid storage batteries, one battery (A1) installed as in FIG. 14 and the other (A2) installed with its right side—the side 146' indicated by dotted line as shown in FIG. 14—on the installation ground. In the experiments, the batteries were charged at a charging voltage of 41.4 continuously for one week and discharged at a current of 17 A until the terminal voltage dropped to 28.8 volts. This charging-discharging cycle was repeated and it was taken that the cycle life came to an end when the discharge duration time fell to 50 percent of the initial time. The test results are illustrated in FIG 16.

Figure 15:
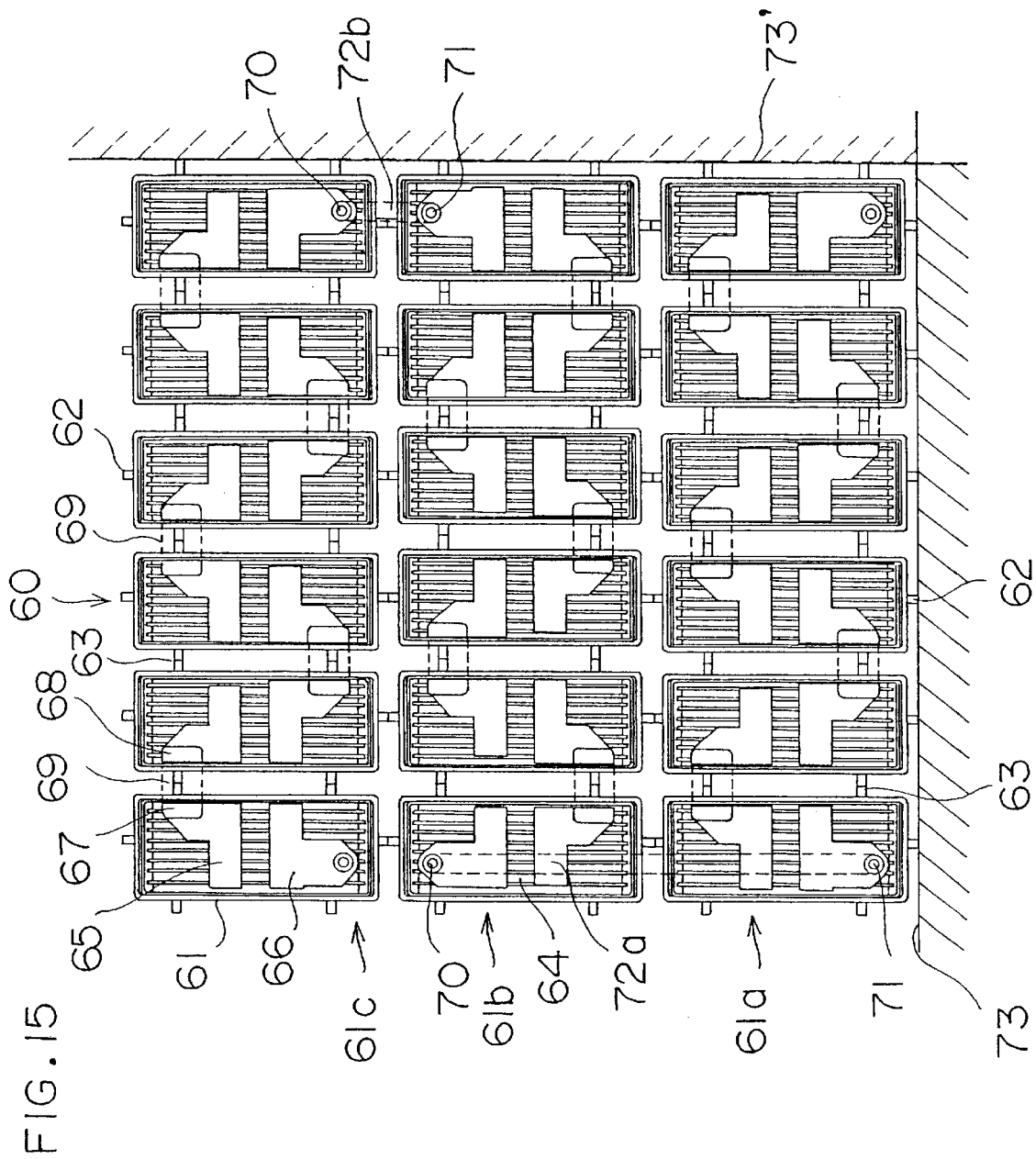
FIG. 15 is a side view of a comparative example lead acid storage battery indicating installation positions.

FIG. 15 shows a comparative example, that is, a 36-volt, 17 Ah lead-acid storage battery 60 composed of 18 monoblock containers, each having one cell. The monoblock container 61 is the size of one cell compartment in the monoblock container according to the present invention. Each container has ribs 62 and 63 that form spaces between that container and the adjacent container. The two adjacent containers are bonded to each other via those ribs. The container houses an assembly element 64 having a strap 65 connected to the positive electrode plates and a strap 66 connected to the negative electrode plates. The straps 65 and 66 have connection tabs 67 and 68 that project above the openings of the containers. Those connection tabs 67 and 68 are connected to each other via a lead alloy connection bar 69 placed over the adjacent container side walls facing each other. This way, the adjacent cells are connected in series. The negative electrode pole 71 of the lowest block 61a made up of 6 cells and the positive electrode pole 70 of the second block 61b made up of 6 cells are connected to each other by connection bar 72a. The negative electrode pole 71 of the second block 61b and the positive electrode pole 70 of the top block 61c are connected to each other by connection bar 72b. This way, the six-cell blocks are connected in series. The container cover to seal those containers has recesses for connection bars 69, 72a and 72b placed over the adjacent side walls and grooves to fit into the openings of the containers. Those recesses and grooves are filled with adhesive to bond the containers and the cover and to seal the connection bars. The numeral 73 indicates the battery installation ground.

In the storage battery of that construction, the lower containers easily deform and crack especially along the ribs 62 under the load of the upper containers. The deformation of the containers could deform the assembly elements. It is also noted that in case the battery is placed with the side indicated by dotted line 73' on the installation ground, the containers in lower layers deform along the ribs 63. If the container cracks, the electrolyte will be lost. It is also feared that if the assembly elements come under the load, resulting in deformation of the electrode plates, then internal short circuit may be caused. That could shorten the battery life.

Trickle cycle life tests were conducted with the comparative example batteries, one battery (B1) installed as in FIG. 15 and the other (B2) installed with its right side—the side indicated by dotted line 73' in FIG. 15—on the installation ground. The test results are shown in FIG. 16. The discharge duration time indicated on the axis of ordinates in FIG. 16 is shown as index with the initial value of the battery as 100. The testing period given on the axis of abscissa is indicated as index with the life of battery B1 as 100 (corresponding to eight months). As is evident from FIG. 16, battery A according to the present invention in any installation position is superior to the comparative battery B in trickle cycle life. The comparative example battery B installed in any position fast falls in discharge duration time toward the end of the cycle life. That is because of abnormal deformation or cracks on the side wall of the container.

In the embodiments set forth above, the cells between the containers are all connected in series. That is not restrictive. Those cells may be connected in parallel.

According to the present invention, as set forth above, it is possible to obtain a high output storage battery with a large number of cells connected with each other without the need of complicated external wiring and a large number of packing parts. It is also noted that the process of joining the containers and the cover is relatively simple. Thus obtained is a highly reliable storage battery that can be installed in any position.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A storage battery comprising a plurality of monoblock containers put together with space provided between each pair of adjacent containers and one container cover to seal the openings of said monoblock containers, each of said monoblock containers having a plurality of cell compartments separated from each other by partitions and each of said cell compartments housing an assembly element comprised of a plurality of positive electrode plates and negative electrode plates stacked with separators placed between the plates, wherein each monoblock container has two cell rows adjacent and parallel to each other, each cell row including a plurality of cell compartments lined up in one direction and separated from each other by partitions, and said monoblock containers being so arranged that said cell rows are parallel with each other.

2. The storage battery in accordance with claim 1, wherein each of said monoblock containers has a positive electrode pole connected to the assembly element in the cell compartment at the first end of one cell row and a negative electrode pole connected to the assembly element in the cell compartment in the adjacent and corresponding position of the other cell row, wherein said container cover has a positive electrode terminal connected to the positive electrode pole of the monoblock container at one end of said arranged monoblock containers, a negative electrode terminal connected to the negative electrode pole of the monoblock container at the other opposing end of said arranged monoblock containers, and connectors connecting the positive electrode pole and negative electrode pole in the adjacent monoblock containers, and wherein the assembly elements in each of said cell rows being electrically connected in series with the assembly elements in the next adjacent cell compartment through an aperture provided in the partition between the two cell compartments and wherein the assembly elements in the cell compartments at an end opposite the first end of each cell row are electrically connected in series through an aperture provided in the partition between the two cell rows.

3. The storage battery in accordance with claim 2, wherein each of said connectors has two ends connected to metal bushings insert molded to said container cover, one end of said bushings being joined to the positive electrode pole of one monoblock container and the other end being joined to the negative electrode pole of the adjacent monoblock container.

4. The storage battery in accordance with claim 1, wherein the stacking direction of electrode plates in each assembly element is the same as the disposing direction of the cell rows.

5. The storage battery in accordance with claim 1, wherein each of said monoblock containers has projections at the lower right and left corners on the outside surface of the sides facing the ends of the cell rows, one of the projections of the monoblock container and the neighboring projection on the adjacent monoblock container being linked with a coupler with the two projections fit into the holes provided in said coupler, thereby uniting the neighboring monoblock containers together.

6. A storage battery comprising a plurality of monoblock containers put together with space provided between each pair of adjacent containers and one container cover to seal the openings of said monoblock containers, each of said monoblock containers having a plurality of cell compartments separated from each other by partitions and each of said cell compartments housing an assembly element comprised of a plurality of positive electrode plates and negative electrode plates stacked with separators placed between the plates, wherein each monoblock container has one cell row including a plurality of cell compartments lined up in one direction and separated from each other by partitions, and said monoblock containers being so arranged that said cell rows are parallel with each other, and wherein each of said monoblock containers has a positive electrode pole connected to the assembly element in the cell compartment at the first end and a negative electrode pole connected to the assembly element in the cell compartment at the other end in the same container, wherein said container cover has a positive electrode terminal connected to the positive electrode pole of the monoblock container at one end of said arranged monoblock containers, a negative electrode terminal connected to the negative electrode pole of the monoblock container at the other opposing end of said arranged monoblock containers, and connectors connecting the positive electrode pole and negative electrode pole in the adjacent monoblock containers, and wherein the assembly elements in each cell row is electrically connected in series with the assembly element in the next adjacent cell compartment through an aperture provided in the partition between the two cell compartments.

7. The storage battery in accordance with claim 6, wherein each of said connectors has two ends connected to metal bushings insert molded to said container cover, one end of said bushings being joined to the positive electrode pole of one monoblock container and the other end being joined to the negative electrode pole of the adjacent monoblock container.

8. A storage battery comprising a plurality of monoblock containers put together with space provided between each pair of adjacent containers, one container cover to seal the openings of said monoblock containers, lead wires for detection of the voltage of series connected assembly elements in each monoblock container, a thermistor for detection of temperature in an assembly element at least in one monoblock container, a lead wire for said thermistor, and a connector having terminals for said lead wires for detection of the voltage and for said lead wire for said thermistor, each of said monoblock containers having a plurality of cell compartments separated from each other by partitions and each of said cell compartments housing an assembly element comprised of a plurality of positive electrode plates and negative electrode plates stacked with separators placed between the plates, said connector being mounted on the container cover, wherein the assembly element in each of said cell compartments is electrically connected in series with the assembly element in the next adjacent cell compartment in a row of adjacent cell compartments through an aperture provided in the partition between the two adjacent cell compartments.

9. The storage battery in accordance with claim 8, wherein said thermistor is mounted in contact with an electrode pole.

10. A storage battery comprising a plurality of monoblock containers put together with space provided between each pair of adjacent containers and one container cover to seal the openings of said monoblock containers, each of said monoblock containers having a plurality of cell compartments separated from each other by partitions and each of said cell compartments housing an assembly element comprised of a plurality of positive electrode plates and negative electrode plates stacked with separators placed between the plates, wherein each monoblock container has one cell row including a plurality of cell compartments lined up in one direction and separated from each other by partitions, and said monoblock containers being so arranged that said cell rows are parallel with each other, and wherein each of said monoblock containers has projections at the lower right and left corners on the outside surface of the sides facing the ends of the cell rows, one of the projections of the monoblock container and the neighboring projection on the adjacent monoblock container being linked with a coupler with the two projections fit into the holes provided in said coupler, thereby uniting the neighboring monoblock containers together.

11. A storage battery comprising a plurality of monoblock containers put together with space provided between each pair of adjacent containers and one container cover to seal the openings of said monoblock containers, each of said monoblock containers having a plurality of cell compartments separated from each other by partitions and each of said cell compartments housing an assembly element comprised of a plurality of positive electrode plates and negative electrode plates stacked with separators placed between the plates, wherein said container cover has one sealed chamber provided with openings communicating with the respective cell compartments, safety valves closing said openings in said sealed chamber, and an air passage having an explosion-proof mechanism through which said sealed chamber communicates with the outside.

12. A storage battery comprising a plurality of monoblock containers put together with space provided between each pair of adjacent containers and one container cover to seal the openings of said monoblock containers, each of said monoblock containers having a plurality of cell compartments separated from each other by partitions and each of said cell compartments housing an assembly element comprised of a plurality of positive electrode plates and negative electrode plates stacked with separators placed between the plates, wherein each monoblock container has one cell row including a plurality of cell compartments lined up in one direction and separated from each other by partitions, and said monoblock containers being so arranged that said cell rows are parallel with each other, and wherein each of said monoblock containers has parallel ribs that form spaces for coolant to pass through between that monoblock container and the adjacent monoblock container, said ribs being provided along the line on the outside surfaces that correspond to the side ends of said partition.

* * * * *